(12) United States Patent
Yang et al.

(10) Patent No.: US 7,215,514 B1
(45) Date of Patent: May 8, 2007

(54) METHOD OF OPERATING A DISK DRIVE INCLUDING ROTATING A PERPENDICULAR WRITE HEAD TO REDUCE A DIFFERENCE BETWEEN SKEW AND TAPER ANGLES, AND A DISK DRIVE

(75) Inventors: Lin Yang, San Jose, CA (US); Lin Mei, San Jose, CA (US); William C. Tipton, II, Gilroy, CA (US); Robert J. McNab, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 378 days.

(21) Appl. No.: 10/971,215

(22) Filed: Oct. 22, 2004

(51) Int. Cl.
*G11B 5/56* (2006.01)
(52) U.S. Cl. .................. 360/294.1; 360/294.6
(58) Field of Classification Search ............. 360/294.1, 360/249.3–294.6
See application file for complete search history.

(56) References Cited

U.S. PATENT DOCUMENTS

| | | | |
|---|---|---|---|
| 5,500,776 A | 3/1996 | Smith | |
| 5,781,381 A | 7/1998 | Koganezawa et al. | |
| 5,793,554 A | 8/1998 | Chainer et al. | |
| 5,796,558 A | 8/1998 | Hanrahan et al. | |
| 5,801,908 A * | 9/1998 | Akiyama et al. | 360/294.4 |
| 5,907,447 A | 5/1999 | Yarmchuk et al. | |
| 5,949,603 A | 9/1999 | Brown et al. | |
| 5,991,115 A | 11/1999 | Chainer et al. | |
| 6,005,738 A | 12/1999 | Chainer et al. | |
| 6,317,285 B1 | 11/2001 | Bi et al. | |
| 6,493,176 B1 | 12/2002 | Deng et al. | |
| 6,504,675 B1 | 1/2003 | Shukh et al. | |
| 6,519,107 B1 | 2/2003 | Ehrlich et al. | |
| 6,522,494 B1 | 2/2003 | Magee | |
| 6,538,836 B1 | 3/2003 | Dunfield et al. | |
| 6,542,326 B1 | 4/2003 | Ell et al. | |
| 6,631,046 B2 | 10/2003 | Szita et al. | |
| 6,633,451 B1 | 10/2003 | Chainer et al. | |
| 6,636,388 B2 | 10/2003 | Stefansky | |
| 6,765,744 B2 | 7/2004 | Gomez et al. | |
| 6,771,443 B2 | 8/2004 | Szita et al. | |
| 6,778,348 B1 | 8/2004 | Carley | |
| 6,798,610 B1 | 9/2004 | Deng et al. | |

(Continued)

OTHER PUBLICATIONS

S. Koganezawa, et al., A Flexural Piggyback Milli-Actuator for Over 5 Gbit/in.2 Density Magnetic Recording, IEEE Transactions on Magnetics, vol. 32, No. 5, Sep. 1996, pp. 3908-3910.

*Primary Examiner*—A. J. Heinz
(74) *Attorney, Agent, or Firm*—Stetina Brunda Garred & Brucker

(57) ABSTRACT

A method of operating a disk drive including providing the disk drive. The disk drive includes a disk with data tracks and an actuator with a slider including a perpendicular magnetic write head. The write head includes leading and trailing sides defining a taper angle. The write head and the actuator define a maximum skew angle with respect to the data tracks. The maximum skew angle being greater than the taper angle. The method further includes rotating the slider during operation of the disk drive to reduce a difference between the skew and taper angles for aligning the write head with the data tracks.

14 Claims, 6 Drawing Sheets

U.S. PATENT DOCUMENTS 6,937,419 B2 8/2005 Suk et al.
2001/0040752 A1 11/2001 Szita et al.
2004/0160696 A1 8/2004 Meyer

* cited by examiner

METHOD OF OPERATING A DISK DRIVE INCLUDING ROTATING A PERPENDICULAR WRITE HEAD TO REDUCE A DIFFERENCE BETWEEN SKEW AND TAPER ANGLES, AND A DISK DRIVE

BACKGROUND OF THE INVENTION

1. Field of the Invention

The present invention relates generally to disk drives, and in particular to a method of operating a disk drive including rotating a perpendicular write head to reduce a difference between skew and taper angles.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base.

The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to data tracks disposed upon the disk.

In further detail, the head stack assembly includes an actuator assembly, at least one head gimbal assembly, and a flex circuit cable assembly. A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body. To facilitate rotational movement of the actuator, the actuator assembly further includes the actuator body that has a bore and a pivot-bearing cartridge engaged within the bore. Each magnetic disk includes opposing disk surfaces. Data may be recorded on a single surface or both surfaces along data annular regions. As such, the head stack assembly may be pivoted such that each transducer head is disposed adjacent the various data annular regions from adjacent an outer diameter (OD) to an inner diameter (ID) of each disk.

Of particular interest are those transducer heads that include a perpendicular write head. The write head includes a write pole, an opposing return pole and an electrically conductive magnetizing coil disposed about the write pole. The write head includes leading and trailing sides. The leading side of the write head is disposed upon the write pole between the write pole and return pole, and the trailing side of the write head is disposed upon the write pole opposite the leading side.

The magnetic disks that are used with such perpendicular write heads typically include recording media having a hard magnetic recording layer and a soft magnetic underlayer that provide a flux path from the write pole to the return pole. To write to the disk, the write head is separated from the recording media by a distance known as the flying height. The recording media is moved past the write head so that the write head follows the data tracks of disk with the recording media first passing under the return pole and then passing under the write pole. Current is passed through the coil to create magnetic flux within the write pole. The magnetic flux passes from the write pole through the hard magnetic recording layer, into the soft underlayer, and across to the return pole.

Magnetization transitions on the recording media are recorded by the trailing side of the write head and reproduce the shape of the trailing side projection on to the recording media below. During the operation of the disk drive, the slider including its write head travels in an arced path across the disk between the OD and the ID of the disk. This results in a change of skew angle of the slider and its write head in relation to the alignment of the data tracks, with maximum skew angles occurring at either the OD or ID.

Some of the prior art write pole configurations are characterized by a cross section disposed towards the recording media or footprint that is generally rectangular in shape. Thus, the leading and trailing sides on the write pole are the same width. Such a configuration, however, can result in undesirable side erasure problems when the slider is disposed at a skew angle. This is because with the slider skewed the leading side is laterally shifted towards an adjacent data track from that which is currently being written.

Prior art attempts to address this phenomenon have included modifying the cross sectional shape of the write pole to be trapezoidal. In this regard, the leading side is smaller than the trailing side to define a taper angle of the write head. In order to more fully compensate for the skew angle side erasure problem, the taper angle would have to equal the maximum skew angle. However, this has proven to be difficult or impractical to implement due to manufacturing limitations associated with large taper angles. As such, there is a need in the art for an improved disk drive and a method of operating the same in comparison to the prior art.

SUMMARY OF THE INVENTION

According to an aspect of the present invention, there is a method of operating a disk drive. The method includes providing the disk drive including a disk with data tracks and an actuator with a slider. The slider includes a perpendicular magnetic write head. The write head includes leading and trailing sides defining a taper angle. The write head and the actuator define a maximum skew angle with respect to the data tracks. The maximum skew angle is greater than the taper angle. The method further includes rotating the slider during operation of the disk drive to reduce a difference between the skew and taper angles for aligning the write head with the data tracks.

According to various embodiments, the taper angle may be between 5 to 10 degrees and the maximum skew angle is between 15 to 18 degrees. The slider may be configured to be able to be rotated at least 30 degrees. In another configuration, the taper angle may be between 5 to 10 degrees and the maximum skew angle is between 11 to 13 degrees. The slider may be configured to be able to be rotated at least 15 degrees. The actuator may include an actuator body and the slider is rotated relative to the actuator body. The write head may include a write pole, an opposing return pole and an electrically conductive magnetizing coil disposed about the write pole. The leading side of the write head is disposed upon the write pole between the write pole and return pole, and the trailing side of the write head is disposed upon the write pole opposite the leading side.

According to another aspect of the present invention, there is provided a disk drive. The disk drive includes a disk drive base and a disk rotatably coupled to the disk drive base. The disk includes data tracks. The disk drive further includes an actuator rotatably coupled to the disk drive base. The actuator includes a slider including a perpendicular magnetic write head. The write head includes leading and trailing sides defining a taper angle. The write head and the actuator define a maximum skew angle with respect to the data tracks. The maximum skew angle is greater than the taper angle. The slider is rotatable with respect to the data tracks to reduce a difference between the skew and taper angles for aligning the write head with the data tracks.

According to various embodiments, the taper angle may be between 5 to 10 degrees and the maximum skew angle is between 15 to 18 degrees. The slider may be configured to be able to be rotated at least 30 degrees. In another configuration, the taper angle may be between 5 to 10 degrees and the maximum skew angle is between 11 to 13 degrees. The slider may be configured to be able to be rotated at least 15 degrees. The actuator may include an actuator body and the slider is rotated relative to the actuator body. The write head may include a write pole, an opposing return pole and an electrically conductive magnetizing coil disposed about the write pole. The leading side of the write head is disposed upon the write pole between the write pole and return pole, and the trailing side of the write head is disposed upon the write pole opposite the leading side.

DESCRIPTION OF THE PREFERRED EMBODIMENTS

Figure 1:
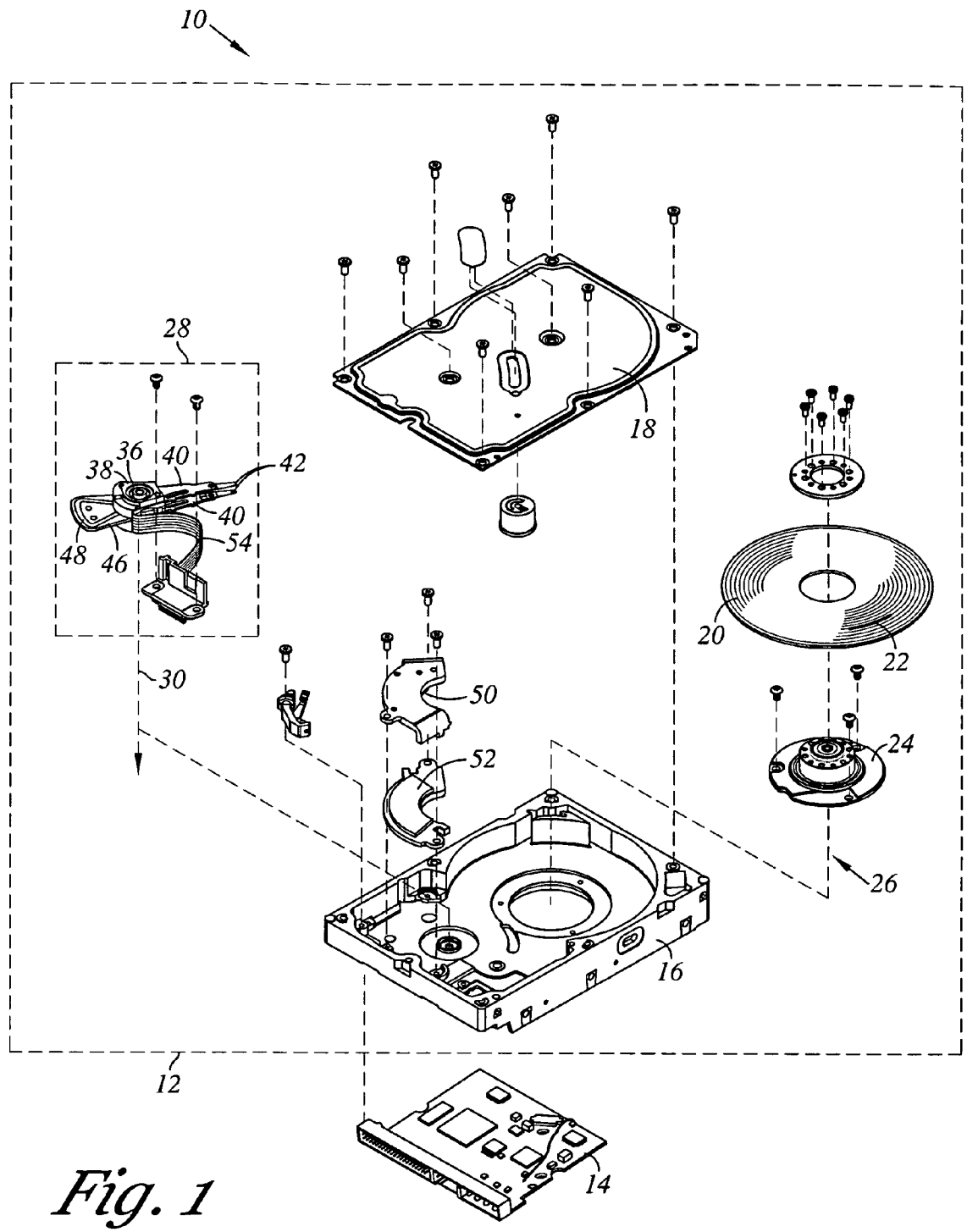
FIG. 1 is an exploded perspective view of a disk drive of an aspect of the present invention.

Referring now to the drawings wherein the showings are for purposes of illustrating preferred embodiments of the present invention only, and not for purposes of limiting the same, FIGS. 1, 2, 3a, 3b, 4–15 illustrate a disk drive and method of operating the same in accordance with aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing that may include a disk drive base 16 and a cover 18 that collectively house at least one magnetic disk 20. The magnetic disk 20 contains a plurality of data tracks for storing data, such as data track 22. The head disk assembly 12 further includes a spindle motor 24 for rotating the magnetic disk 20 about an axis of rotation 26. The head disk assembly 12 further includes a head stack assembly 28 that rotates between limited positions about a pivot axis 30.

The head stack assembly 28 includes a rotary actuator 36. The actuator 36 includes an actuator body 38 and actuator arms 40 that extend from the actuator body 38. Distally attached to the actuator arms 40 are suspension assemblies 42. The suspension assemblies 42 respectively support air-bearing sliders 44 (as shown in phantom in FIGS. 3a, 3b). Each of the sliders 44 includes a transducer head for reading and writing data from and to the disk 20. The suspension assemblies 42 with the sliders 44 are referred to as head gimbal assemblies. It is contemplated that the number of actuator arms and suspension assemblies may vary depending upon the number of disks and disk surfaces utilized.

The actuator 36 further includes a coil support 46 that extends from one side of the actuator body 38 opposite the actuator arms 40. The coil support 46 is configured to support a coil 48. A pair of magnetic elements 50, 52 are attached to the disk drive base 16 (magnetic element 50 is indicated by the dashed lead line and it is understood that the magnetic element 50 is disposed underneath its mount). The coil 48 interacts with the magnetic elements 50, 52 to form a voice coil motor for controllably rotating the actuator 36 for controllably positioning the sliders 44 adjacent the disk 20. As such, the head stack assembly 28 may be pivoted such that each slider 44 with its transducer head is disposed adjacent the various data tracks disposed between an outer diameter (OD) to an inner diameter (ID) of each disk 20. The head stack assembly 28 further includes a flex circuit 54 that is disposed in electrical communication with the printed circuit board 14. The flex circuit 54 supplies current to the coil 48 and carries signals between the transducer heads of the sliders 44 and the printed circuit board assembly 14.

Figure 2:
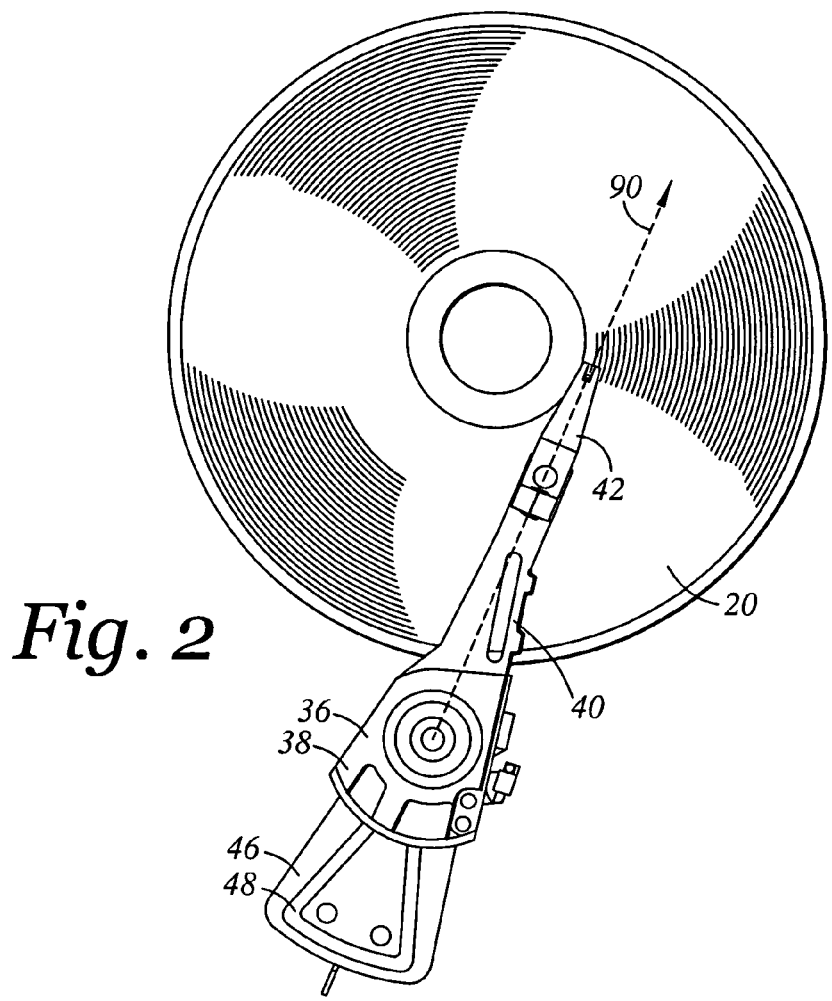
FIG. 2 is an top plan view of an actuator and a magnetic disk of the disk drive of FIG. 1 as assembled.
Figure 3A:
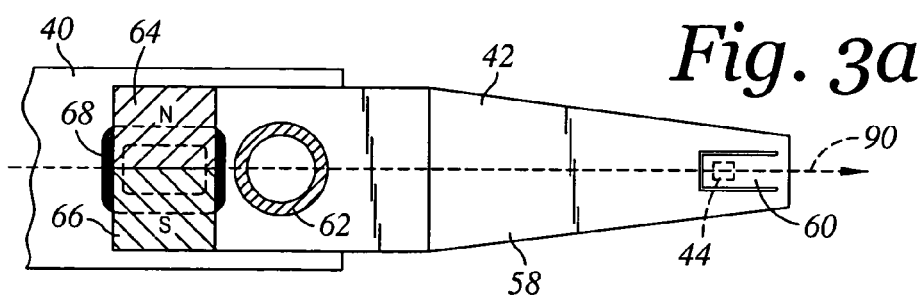
FIG. 3a is an enlarged view of a suspension assembly (including an air bearing slider shown in phantom) and a portion of an actuator arm of the actuator of FIG. 2.
Figure 3B:
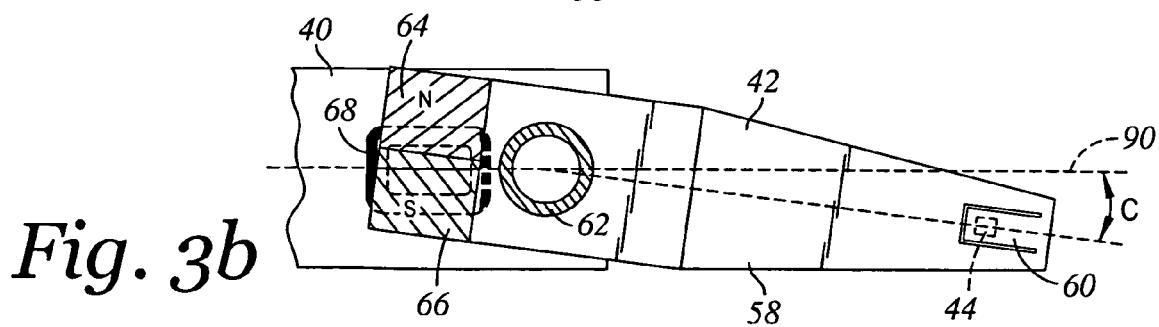
FIG. 3b is the enlarged view of the suspension assembly and the portion of the actuator arm of FIG. 3a, however, with the suspension assembly rotated relative to the portion of the actuator arm.

Referring now to FIG. 2 there is depicted a top plan view of the actuator 36 and the magnetic disk 20 of the disk drive 10 of FIG. 1 as assembled. As can be seen the topmost actuator arm 40 is disposed above the disk 20. FIG. 3a is an enlarged view of the suspension assembly 42 (including the air bearing slider 44 shown in phantom indicating the slider 44 as disposed adjacent the disk 20) and a portion of an actuator arm 40 of the actuator of FIG. 2. The suspension assembly 42 includes a suspension 58. The suspension 58 includes a gimbal 60 for supporting the air bearing slider 44. The suspension 58 is rotatably coupled to the actuator arm 40 with a pivot 62. In the particular embodiment shown, a pair of magnets 64, 66 of opposing polarities is mounted upon the suspension 58 opposite the gimbal 60. The magnets 64, 66 interact with a coil 68 mounted upon the actuator arm 40 to form a voice coil motor for rotating the suspension assembly 42 relative to the actuator arm 40 and actuator body 38. The coil 68 is disposed in electrical communication with the printed circuit board assembly 14. The printed circuit board assembly 14 passes a current to the coil 68 of varying magnitude and direction of current passed through the coil 68 for selectively controlling the relative rotation of the suspension assembly 42. FIG. 3b depicts the suspension assembly 42 having been rotated relative to its position as shown in FIG. 3a.

Figure 4:
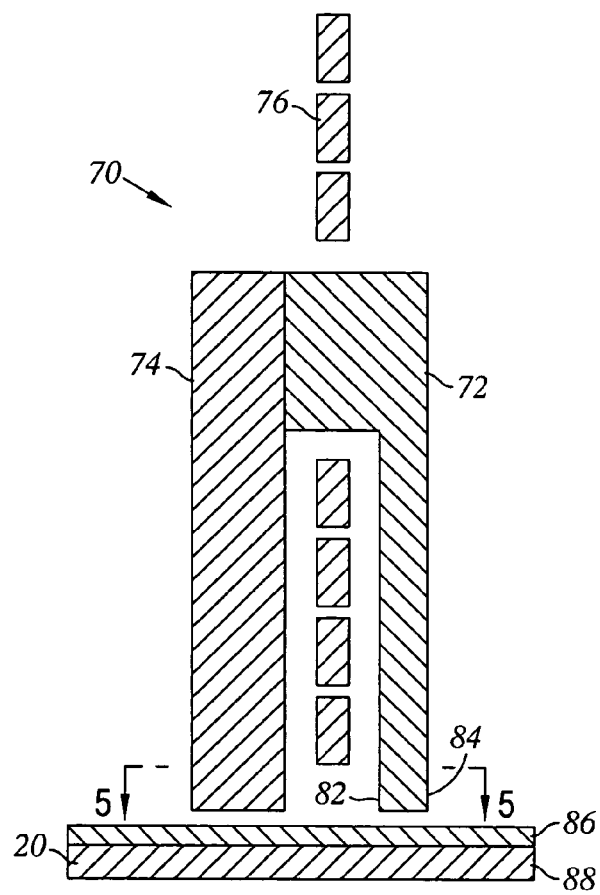
FIG. 4 is a side cross sectional view of a perpendicular write head of the air bearing slider of FIG. 2 as shown in relation to the magnetic disk.
Figure 5:
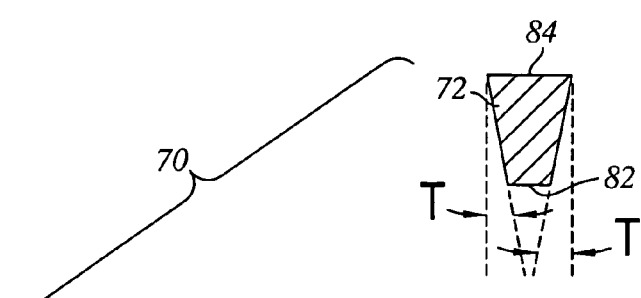
FIG. 5 is a top cross sectional view of the perpendicular write head of FIG. 4 as seen along axis 5—5 of FIG. 4 including a taper angle (T)
Figure 5:
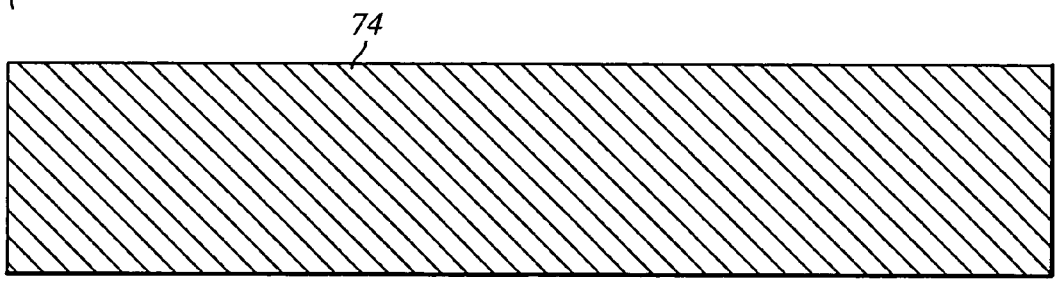

As mentioned above, the air bearing slider 44 includes transducer head. According to an aspect of the present invention, each such transducer head includes a perpendicular write head 70 as shown in FIGS. 4 and 5. FIG. 4 depicts a side cross sectional view of the perpendicular write head 70 of the air bearing slider 44 of FIG. 2 as shown in relation to the magnetic disk 20. For ease of illustration, remaining portions of the slider 44 are not shown such as a slider substrate, insulating layers and read elements. FIG. 5 is a top cross sectional view of the perpendicular write head 70 of FIG. 4 as seen along axis 5—5 of FIG. 4. The perpendicular write head 70 includes a write pole 72, an opposing return pole 74 and an electrically conductive magnetizing coil 76 disposed about the write pole 72. The perpendicular write head 70 includes leading and trailing sides 78, 80. The leading side 82 of the write head 70 is disposed upon the write pole 72 between the write pole 72 and return pole 74, and the trailing side 84 of the write head 70 is disposed upon the write pole 72 opposite the leading side 82. The trailing side 84 has a width greater than that of the leading side 82 to as to define a taper angle (T) that characterizes the write head 70. It is contemplated that other configurations may include the return pole 74 being disposed adjacent the trailing side 84. In addition, though not shown, a second return pole and coil may also be utilized.

The magnetic disk 20 includes recording media having a hard magnetic recording layer 86 and a soft magnetic underlayer 88 which provide a flux path from the write pole 72 to the return pole 74. To write to the disk 20, the perpendicular write head 70 is separated from the recording media by a distance known as the flying height. The recording media is moved past the perpendicular write head 70 so that the perpendicular write head 70 follows the data tracks 22 of disk 20 with the recording media first passing under the return pole 74 and then passing under the write pole 72. The direction arrow is shown as indicating the recording media moving to the right relative to the perpendicular write head 70. In this regard, the recording media first passes under the leading side 82 and then the wider trailing side 84 of the write head 70. Current is passed through the coil 76 to create magnetic flux within the write pole 72. The magnetic flux passes from write pole 72 through the hard magnetic recording layer 86, into the soft underlayer 88, and across to the return pole 74.

Magnetization transitions on the recording media are recorded by the trailing side 84 of the write head 70 and reproduce the shape of the trailing side projection on to the recording media below. During the operation for disk drive 10, the air bearing slider 44 including its perpendicular write head 70 travels in an arced path across the disk between in OD and the ID of the disk 20. This results in a change of skew angle of the air bearing slider 44 and its perpendicular write head 70 in relation to the alignment of the data tracks 22, with maximum skew angles occurring at either the OD or ID. The actuator arm 40 defines a longitudinal axis 90 that extends through the axis of rotation 30 and the perpendicular write head 70. Such skew angles of the air bearing slider 44 is in relation to the longitudinal axis 90.

Figure 6:
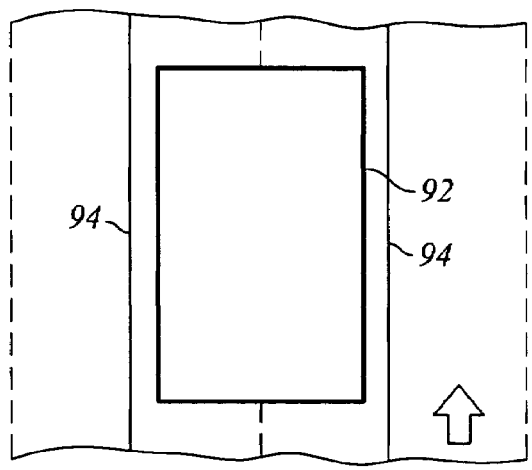
FIG. 6 is a top projection view of a prior art rectangular write head as shown with a zero skew angle in relation data track orientation lines.
Figure 7:
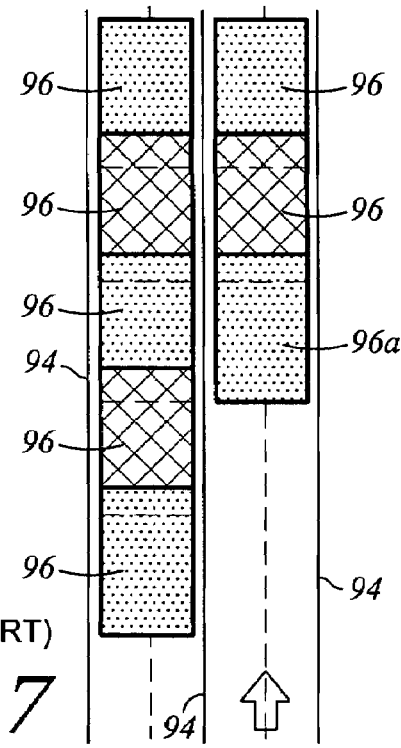
FIG. 7 is a symbolic representation of a series of transitions written upon perpendicular recording media on two adjacent data tracks associated with the prior art rectangular write head with a zero skew angle of FIG. 6.

Referring now to FIG. 6 there is depicted a top projection view of a prior art write head projection 92. The prior art write head projection 92 is characterized by a generally rectangular cross sectional footprint disposed towards the recording media. The leading and trailing sides on the write pole are the same width. The prior art write head projection 92 is shown with a zero skew angle in relation to data track orientation lines 94. A direction arrow indicates the direction of recording media movement relative to the prior art write head projection 92. FIG. 7 is a symbolic representation of a series of transitions 96 written upon perpendicular recording media on two adjacent data tracks associated with the prior art rectangular write head projection 92 of FIG. 6. The most recently written transition is transition 96a.

Figure 8:
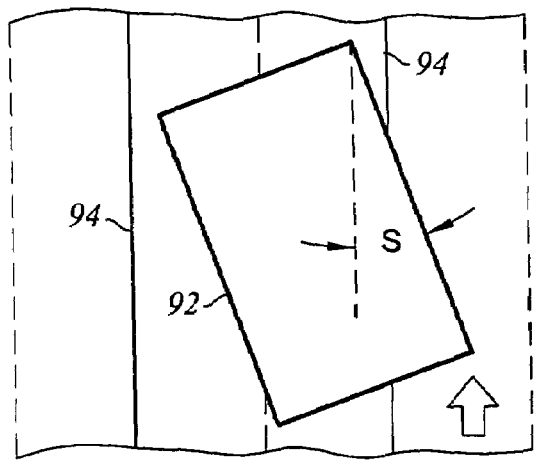
FIG. 8 is the top projection view of the prior art rectangular write head of FIG. 6, however, as shown with a skew angle (S) in relation data track orientation lines.
Figure 9:
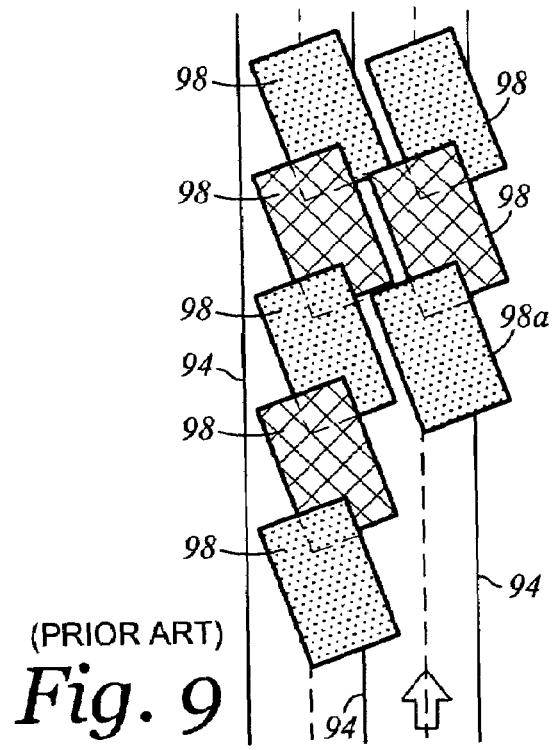
FIG. 9 is a symbolic representation of a series of transitions written upon perpendicular recording media on two adjacent data tracks associated with the prior art rectangular write head with at a skew angle (S) of FIG. 8.

Such prior art write head configuration, however, can result in undesirable side erasure problems when the associated slider is disposed at a skew angle (S) such as illustrated in FIG. 8. This is because with the associated slider skewed the leading side of the write head is laterally shifted towards an adjacent data track from that which is currently being written. Thus, the projection shown in FIG. 8 would correspond to a skew angle associated with the actuator pivoted adjacent an ID of a disk such as depicted in FIG. 2. FIG. 9 is a symbolic representation of a series of transitions 98 written upon perpendicular recording media on two adjacent data tracks associated with the prior art rectangular write head projection 92 at a skew angle (S) of FIG. 8. The most recently written transition is transition 98a.

Figure 10:
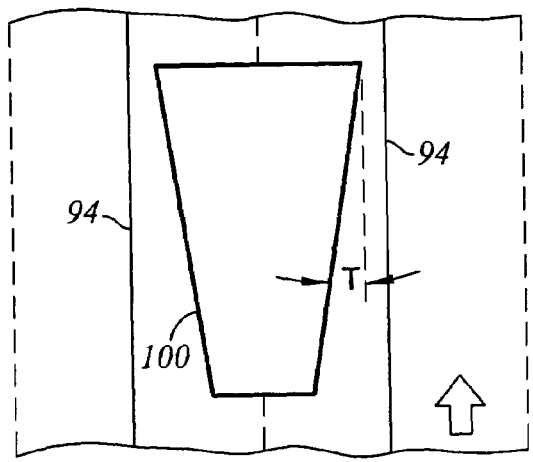
FIG. 10 is a top projection view of a prior art tapered write head with a taper angle (T) as shown with a zero skew angle in relation data track orientation lines.
Figure 11:
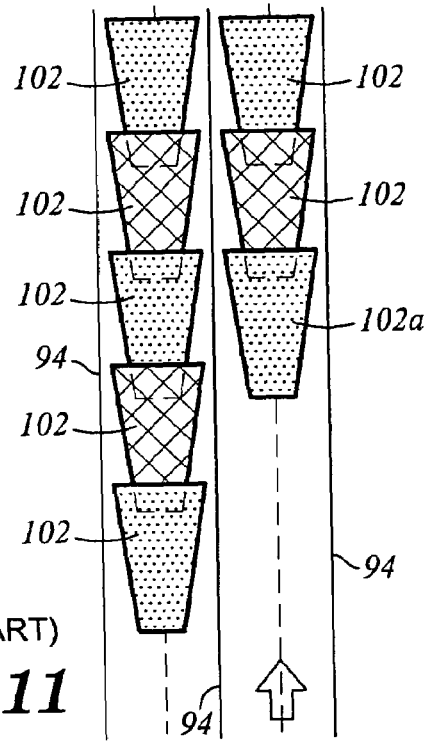
FIG. 11 is a symbolic representation of a series of transitions written upon perpendicular recording media on two adjacent data tracks associated with the prior art tapered write head with a zero skew angle of FIG. 10.

Referring now to FIG. 10 there depicted a top projection view of a prior art tapered write head projection 100 with a taper angle (T) as shown with a zero skew angle in relation data track orientation lines 94. In this regard, the prior art tapered write head projection 100 includes a cross sectional footprint that is trapezoidal in shape. FIG. 11 is a symbolic representation of a series of transitions 102 written upon perpendicular recording media on two adjacent data tracks associated with the prior art tapered write head projection 100 with a zero skew angle of FIG. 10. The most recently written transition is transition 102a.

Figure 12:
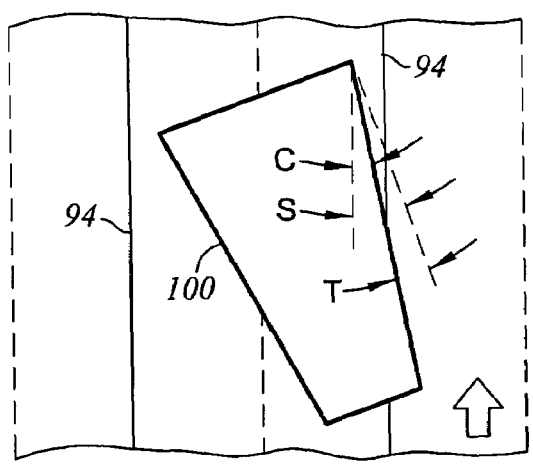
FIG. 12 is a top projection view of the prior art tapered write head associated with FIG. 10, however, as shown with a skew angle (S) in relation data track orientation lines.
Figure 13:
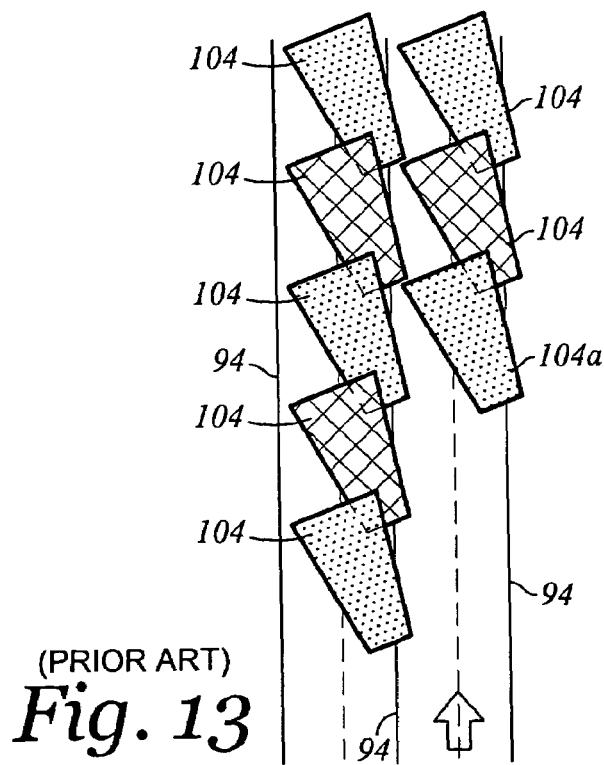
FIG. 13 is a symbolic representation of a series of transitions written upon perpendicular recording media on two adjacent data tracks associated with the prior art tapered write head with a skew angle (S) of FIG. 12.

Referring now to FIG. 12 there is depicted a top projection view of the prior art tapered write head projection 100 associated with FIG. 10, however, as shown with a skew angle (S) in relation data track orientation lines 94. FIG. 13 is a symbolic representation of a series of transitions 104 written upon perpendicular recording media on two adjacent data tracks associated with the prior art tapered write head projection 100 at a skew angle (S) of FIG. 12. The most recently written transition is transition 104a.

It is understood that utilization of a tapered or trapezoidal head shape is used to compensate for changes in skew angle to mitigate side track erasure problems. Thus, the taper angle (T) is desirable to be equal to a maximum skew angle for a given disk drive configuration. However, in practice, the prior art tapered write head projection 100 is characterized by a taper angle (T) that is less than a maximum skew angle (S) as shown in its position in FIG. 12. An angle (C) represents the difference between the skew angle (S) and the taper angle (T). The amount of taper angle (T) is limited due to manufacturing restrictions. Therefore, as a practical matter, while at relatively small skew angles the tapering technique is effective in mitigating side erasure problems. At relatively large skew angles, such as at an ID or OD of a disk, the skew angle is greater than the manufactured taper angle and the tapering technique fails to fully mitigate the side erasure problem.

Figure 14:
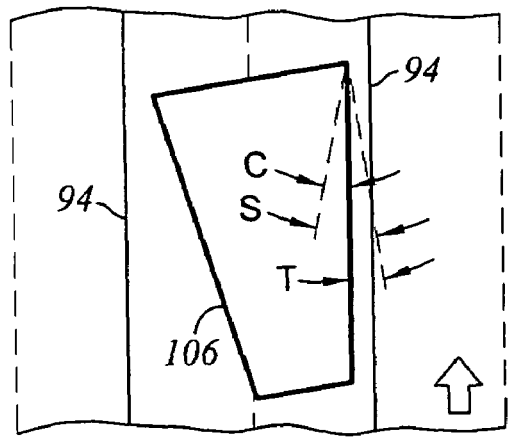
FIG. 14 is a top projection view of the write head of the present invention with a taper angle (T) as shown with a skew angle (S) and rotated by an angle (C) in relation data track orientation lines.
Figure 15:
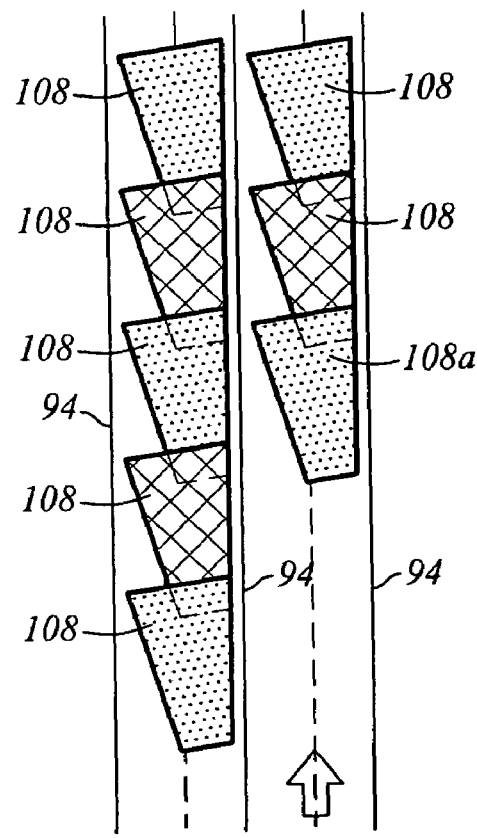
FIG. 15 is a symbolic representation of a series of transitions written upon perpendicular recording media on two adjacent data tracks associated with the write head of the present invention with a taper angle (T) as shown with a skew angle (S) and rotated by an angle (C) in relation data track orientation lines.

FIG. 14 is a top projection view of the write head projection 106 of the write head 70 of the present invention. The write head projection includes a taper angle (T) and is shown with a maximum skew angle (S) and rotated by an angle (C) in relation data track orientation lines. FIG. 15 is a symbolic representation of a series of transitions 108 written upon perpendicular recording media on two adjacent data tracks associated with the write head 70 of the present invention. The most recently written transition is transition 108a.

According to an aspect of the present invention, there is provided the disk drive 10. The disk drive 10 includes the disk drive base 16 and the disk 20 rotatably coupled to the disk drive base 16. The disk 20 includes data tracks, such as data track 22. The disk drive 10 further includes the actuator 36 rotatably coupled to the disk drive base 16. The actuator 36 includes the slider 44 including the perpendicular magnetic write head 70. The write head 70 includes the leading and trailing sides 82, 84 defining the taper angle (T). The write head 70 and the actuator 36 define a maximum skew angle (S) with respect to the data tracks. The maximum skew angle is greater than the taper angle. The slider 44 is rotatable with respect to the data tracks to reduce a difference between the skew and taper angles for aligning the write head 70 with the data tracks.

According to various embodiments, the taper angle may be between 5 to 10 degrees and the maximum skew angle is between 15 to 18 degrees. Such maximum skew angle of such magnitudes may correspond to a 3½ inch diameter disk for example. The skew angles may be between 15 to 16 degrees at an ID and 15 to 18 degrees at on OD for example. In such an arrangement, the slider 44 may be configured to be able to be rotated at least 30 degrees. Thus, such rotation may be used to compensate for skew angle side erasure effects. In another configuration, the taper angle may be between 5 to 10 degrees and the maximum skew angle is between 11 to 13 degrees. Such skew angles may correspond to a 2.5 inch diameter disk for example. In such an arrangement, the slider 44 may be configured to be able to be rotated at least 15 degrees.

The actuator 36 may include the actuator body 38, and the slider 44 may be rotated relative to the actuator body 36. As discussed above, this may be achieved through the use of the magnets 64, 66, the suspension 58, and a coil 68. Such a configuration is referred to as a dual stage actuator. This is because the slider 44 is first moved relative to the data tracks due to the actuator 36 pivoting about the axis of rotation 30 and is secondly moved due to the rotation of the suspension 58. Other configurations for achieving such secondary rotation may be utilized and may be selected from those that are well known in the art. For example, another dual stage configuration is disclosed in U.S. Pat. No. 6,636,388 dated Oct. 21, 2003 (the contents of which are incorporated herein by reference). It is noted that such prior art dual stage actuator configurations have been utilized to facilitate track following adjustments. In contrast, the present invention recognizes that such a secondary rotation may be utilized for compensation of the skew angle effects with respect to the data tracks while taking into consideration the taper angle of the write pole.

As mentioned above, the write head 70 may include a write pole 72, an opposing return pole 74 and an electrically conductive magnetizing coil 76 disposed about the write pole 72. The leading side 82 of the write head 70 is disposed upon the write pole 72 between the write pole 72 and return pole 74, and the trailing side 84 of the write head 70 is disposed upon the write pole 72 opposite the leading side 82. Though not shown, it is contemplated that other pole configurations may be utilized. For example, the positioning of the return pole may be opposite the write pole. Further, there may be multiple return poles, such as with a return pole on each side of the write pole.

According to another aspect of the present invention, there is provided the disk drive 10. The disk drive 10 includes the disk drive base 16 and the disk 20 rotatably coupled to the disk drive base 16. The disk 20 includes data tracks, such as data track 22. The disk drive 10 further includes the actuator 36 rotatably coupled to the disk drive base 16. The actuator 36 includes the slider 44 including the perpendicular magnetic write head 70. The write head 70 includes leading and trailing sides 82, 84 defining a taper angle. The write head 70 and the actuator define a maximum skew angle with respect to the data tracks. The maximum skew angle is greater than the taper angle. The method provides for rotating the slider 44 with respect to the data tracks to reduce a difference between the skew and taper angles for aligning the write head 70 with the data tracks. Any of the above described configurations for the actuator 36 and the write head 70 may be utilized.

We claim:

1. A method of operating a disk drive, the method comprising:
    a) providing the disk drive including a disk with data tracks and an actuator with a slider including a perpendicular magnetic write head, the write head including leading and trailing sides defining a taper angle, the write head and the actuator defining a maximum skew angle with respect to the data tracks, the maximum skew angle being greater than the taper angle, and
    b) rotating the slider during operation of the disk drive to reduce a difference between the skew and taper angles for aligning the write head with the data tracks.

2. The method of claim 1 wherein the taper angle is between 5 to 10 degrees and the maximum skew angle is between 15 to 18 degrees.

3. The method of claim 1 wherein the slider is able to be rotated at least 30 degrees.

4. The method of claim 1 wherein the taper angle is between 5 to 10 degrees and the maximum skew angle is between 11 to 13 degrees.

5. The method of claim 1 wherein the slider is able to be rotated at least 15 degrees.

6. The method of claim 1 wherein the actuator includes an actuator body and the slider is rotated relative to the actuator body.

7. The method of claim 1 wherein the write head includes a write pole, an opposing return pole and an electrically conductive magnetizing coil disposed about the write pole, the leading side of the write head is disposed upon the write pole between the write pole and return pole, the trailing side of the write head is disposed upon the write pole opposite the leading side.

8. A disk drive comprising:
   a disk drive base;
   a disk rotatably coupled to the disk drive base, the disk includes data tracks; and
   an actuator rotatably coupled to the disk drive base, the actuator including a slider including a perpendicular magnetic write head, the write head including leading and trailing sides defining a taper angle, the write head and the actuator defining a maximum skew angle with respect to the data tracks, the maximum skew angle being greater than the taper angle, the slider being rotatable with respect to the data tracks to reduce a difference between the skew and taper angles for aligning the write head with the data tracks.

9. The disk drive of claim 8 wherein the taper angle is between 5 to 10 degrees and the maximum skew angle is between 15 to 18 degrees.

10. The disk drive of claim 8 wherein the slider is able to be rotated at least 30 degrees.

11. The disk drive of claim 8 wherein the taper angle is between 5 to 10 degrees and the maximum skew angle is between 11 to 13 degrees.

12. The disk drive of claim 8 wherein the slider is able to be rotated at least 15 degrees.

13. The disk drive of claim 8 wherein the actuator includes an actuator body and the slider is rotatable relative to the actuator body.

14. The disk drive of claim 8 wherein the write head includes a write pole, an opposing return pole, and an electrically conductive magnetizing coil disposed about the write pole, the leading side of the write head is disposed upon the write pole between the write pole and return pole, the trailing side of the write head is disposed upon the write pole opposite the leading side.

* * * * *